US011208555B2

(12) United States Patent
Kim et al.

(10) Patent No.: US 11,208,555 B2
(45) Date of Patent: Dec. 28, 2021

(54) THERMOPLASTIC RESIN COMPOSITION FOR LASER DIRECT STRUCTURING PROCESS AND MOLDED ARTICLE PRODUCED THEREFROM (71) Applicant: LOTTE ADVANCED MATERIALS CO., LTD., Yeosu-si (KR)

(72) Inventors: Nam Hyun Kim, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 364 days.

(21) Appl. No.: 16/473,128

(22) PCT Filed: Dec. 29, 2017

(86) PCT No.: PCT/KR2017/015722
§ 371 (c)(1),
(2) Date: Jun. 24, 2019

(87) PCT Pub. No.: WO2018/124807
PCT Pub. Date: Jul. 5, 2018

(65) Prior Publication Data
US 2019/0352504 A1 Nov. 21, 2019

(30) Foreign Application Priority Data
Dec. 30, 2016 (KR) .................. 10-2016-0184491

(51) Int. Cl.
*C08L 77/00* (2006.01)
*B29C 59/16* (2006.01)
(Continued)

(52) U.S. Cl.
CPC .............. *C08L 77/00* (2013.01); *B29C 59/16* (2013.01); *C23C 18/1641* (2013.01);
(Continued)

(58) Field of Classification Search
CPC ...................................................... C08L 77/00
See application file for complete search history.

(56) References Cited

U.S. PATENT DOCUMENTS 5,840,791 A * 11/1998 Magerstedt ............ B41M 5/267
524/405
8,309,640 B2 11/2012 Li et al.
(Continued)

FOREIGN PATENT DOCUMENTS

| CA | 2361399 A1 | 8/2000 |
| CN | 1149884 A | 5/1997 |

(Continued)

OTHER PUBLICATIONS

International Search Report in counterpart International Application No. PCT/KR2017/015722 dated Apr. 9, 2018, pp. 1-4.
(Continued)

*Primary Examiner* — Michael F Pepitone
(74) *Attorney, Agent, or Firm* — Additon, Pendleton & Witherspoon, P.A.

(57) ABSTRACT

The present invention relates to a thermoplastic resin composition for a laser direct structuring process and a molded article produced therefrom. In one embodiment, the thermoplastic resin composition comprises: a polyamide resin; a polyester resin; a rubber-modified aromatic vinyl-based graft copolymer; an inorganic filler; and an additive for laser direct structuring.

15 Claims, 1 Drawing Sheet (51) Int. Cl.
*C23C 18/16* (2006.01)
*C23C 18/20* (2006.01)
*B29K 77/00* (2006.01)
*B29K 105/00* (2006.01)
*B29K 509/08* (2006.01)

(52) U.S. Cl.
CPC ........ *C23C 18/204* (2013.01); *B29K 2077/00* (2013.01); *B29K 2105/0005* (2013.01); *B29K 2509/08* (2013.01); *C08L 2205/03* (2013.01)

(56) References Cited

U.S. PATENT DOCUMENTS

| | | | |
|---|---|---|---|
| 9,890,281 | B2 | 2/2018 | Jung et al. |
| 2004/0152808 | A1* | 8/2004 | Tezuka ................ C08F 291/00 524/127 |
| 2014/0066560 | A1 | 3/2014 | Stoppelmann et al. |
| 2014/0353543 | A1 | 12/2014 | Wu et al. |
| 2015/0005426 | A1 | 1/2015 | Stoppelmann et al. |
| 2015/0175803 | A1 | 6/2015 | Stoppelmann |
| 2015/0353714 | A1 | 12/2015 | Takano et al. |
| 2016/0108234 | A1 | 4/2016 | Kikuchi et al. |
| 2016/0185963 | A1 | 6/2016 | Seo |
| 2016/0272788 | A1 | 9/2016 | Stoppelmann et al. |

FOREIGN PATENT DOCUMENTS

| | | |
|---|---|---|
| CN | 1345383 A | 4/2002 |
| CN | 1513028 A | 7/2004 |
| CN | 104275886 A | 1/2015 |
| CN | 105339435 A | 2/2016 |
| CN | 105531309 A | 4/2016 |
| CN | 105733255 A | 7/2016 |
| GN | 104725847 A | 6/2015 |
| JP | 2007-161940 | 6/2007 |
| JP | 2012-036246 A | 2/2012 |
| KR | 10-2001-0058443 A | 7/2001 |
| KR | 10-2011-0018319 A | 2/2011 |
| KR | 10-2014-0029130 A | 3/2014 |
| KR | 10-2015-0073093 A | 6/2015 |
| KR | 10-2016-0078615 A | 7/2016 |
| WO | 2005/090476 A1 | 9/2005 |
| WO | 2018/124807 A1 | 7/2018 |

OTHER PUBLICATIONS

Office Action in counterpart Chinese Application No. 201780081398.8 dated Mar. 3, 2021, pp. 1-6.

* cited by examiner

THERMOPLASTIC RESIN COMPOSITION FOR LASER DIRECT STRUCTURING PROCESS AND MOLDED ARTICLE PRODUCED THEREFROM

CROSS-REFERENCE TO RELATED APPLICATIONS

This application claims priority to and the benefit of International Application No. PCT/KR2017/015722, filed Dec. 29, 2017, which published as WO 2018/124807 on Jul. 5, 2018; and Korean Patent Application No. 10-2016-0184491, filed in the Korean Intellectual Property Office on Dec. 30, 2016, the entire disclosure of each of which is incorporated herein by reference.

TECHNICAL FIELD

The present invention relates to a thermoplastic resin composition for laser direct structuring and a molded article produced therefrom.

BACKGROUND ART

A laser direct structuring (LDS) process is a pretreatment method for coating a metal layer on a surface of a resin material. Such laser direct structuring can modify a plating target to have suitable properties for plating by irradiating the surface of the resin material with laser beams in a shape corresponding to the plating target.

In general, for a resin material applicable to laser direct structuring, a resin composition contains an LDS additive. The LDS additive is decomposed to discharge metal atoms by laser beams reaching the surface of the resin material, thereby forming metal nuclei. Such metal nuclei are buried in a fine size in the region irradiated with laser beams, thereby increasing not only surface roughness, but also plateability by acting as crystal nuclei upon plating.

Laser direct structuring allows rapid and economic formation of electronic/electric circuits on a three-dimensional shape of a molded article. For example, laser direct structuring may be advantageously used in manufacture of antennas for portable electronic devices, radio frequency identification (RFID) antennas, and the like.

In recent years, with increasing tendency of reduction in weight and thickness of portable device products, there is increasing demand for a thermoplastic resin composition which can exhibit excellent mechanical properties and molding processability (external appearance), and as the thickness of a micro-pattern (plating region) of a portable electronic device and the like is reduced, a plating layer is more likely to be delaminated.

In addition, a portable device such as a smartphone and the like is required to have a waterproof function. In order to design such a portable device to prevent moisture permeation into circuits inside the portable device, it is necessary to ensure complete bonding between a rear cover of the portable device and an antenna component composed of an LDS material, instead of simple assembly therebetween. Accordingly, in order to ensure the waterproof function, there is a need for a process of completely bonding heterogeneous materials to each other through double injection molding of a material for the rear cover onto the previously inserted LDS material. However, insertion of the antenna component composed of an LDS material, such as a typical polycarbonate used in the art, has a problem of loss of an LDS pattern due to low heat resistance upon double injection molding.

The background technique of the present invention is disclosed in Korean Patent Laid-open Publication No. 2011-0018319.

DISCLOSURE

Technical Problem

It is one aspect of the prevent invention to provide a thermoplastic resin composition for laser direct structuring, which has good plating adhesion and flexural modulus.

It is another aspect of the prevent invention to provide a thermoplastic resin composition for laser direct structuring, which has good impact resistance and heat resistance.

It is a further aspect of the prevent invention to provide a thermoplastic resin composition for laser direct structuring, which exhibits good bondability to a base material to allow double injection molding.

It is yet another aspect of the present invention to provide a molded article formed of the thermoplastic resin composition for laser direct structuring, as set forth above.

Technical Solution

One aspect of the present invention relates to a thermoplastic resin composition for laser direct structuring. In one embodiment, the thermoplastic resin composition includes: a polyamide resin; a polyester resin; a rubber-modified aromatic vinyl graft copolymer; an inorganic filler; and an additive for laser direct structuring.

In one embodiment, the thermoplastic resin composition may include: 100 parts by weight of a base resin including about 25 wt % to about 55 wt % of the polyamide resin, about 5 wt % to about 25 wt % of the polyester resin, about 5 wt % to about 20 wt % of the rubber-modified aromatic vinyl graft copolymer, and about 25 wt % to about 50 wt % of the inorganic filler; and about 0.1 parts by weight to about 20 parts by weight of the additive for laser direct structuring.

In one embodiment, the polyamide resin may include an aliphatic polyamide resin.

In one embodiment, the polyamide resin may include at least one selected from among polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 615, polyamide 616, and polyamide 613.

In one embodiment, the polyester resin may include at least one selected from among polyethylene terephthalate, polybutylene terephthalate, polyethylene naphthalate, polytrimethylene terephthalate, and polycyclohexylene terephthalate.

In one embodiment, the polyester resin may have an inherent viscosity of about 0.6 dl/g to about 2.0 dl/g.

In one embodiment, the rubber-modified aromatic vinyl graft copolymer may be obtained by graft polymerization of a monomer mixture of an aromatic vinyl monomer and a vinyl cyanide monomer on a rubber polymer.

In one embodiment, the rubber-modified aromatic vinyl graft copolymer and the polyamide resin may be present in a weight ratio of about 1:1.5 to about 1:10.

In one embodiment, the polyester resin and the polyamide resin may be present in a weight ratio of about 1:1.5 to about 1:8.

In one embodiment, the inorganic filler may include at least one selected from among glass fibers, talc, wollastonite, whisker, silica, mica, and basalt fibers.

In one embodiment, the additive for laser direct structuring may include at least one selected from among a heavy metal composite oxide spinel and a copper salt.

In one embodiment, the additive for laser direct structuring and the polyamide resin may be present in a weight ratio of about 1:3 to about 1:10.

In one embodiment, the thermoplastic resin composition may have a weight-dropping fracture height of about 25 cm or more, at which dropping a 500 g metal-tip weight on a 1 mm thick specimen results in generation of cracks on the specimen in a DuPont drop test.

In one embodiment, the thermoplastic resin composition may have a bonding strength of about 15 kgf/cm$^2$ to about 40 kgf/cm$^2$, as measured on a bonding specimen at a rate of 5 mm/min using a universal testing machine (UTM), the bonding specimen being prepared by injection molding after bonding a specimen of the thermoplastic resin composition to a polycarbonate base to have a bonding size of 1.2 cm×1.2 cm×3.2 mm.

Another aspect of the present invention relates to a molded article formed of the thermoplastic resin composition set forth above. In one embodiment, the molded article may include a metal layer formed on at least part of a surface thereof through a laser direct structuring process and a plating process.

Advantageous Effects

A thermoplastic resin composition for laser direct structuring according to the present invention and a molded article produced therefrom have good properties in terms of plating adhesion, flexural modulus, impact resistance, and heat resistance, and can exhibit good bondability to a base material such as a polycarbonate to allow double injection molding.

BEST MODE

Hereinafter, embodiments of the present invention will be described in detail with reference to the accompanying drawings. Description of known functions and constructions which can unnecessarily obscure the subject matter of the present invention will be omitted herein.

Further, the terms used herein are defined by taking functions of the present invention into account and can be changed according to user or operator's custom or intention. Therefore, definition of the terms should be made according to the overall disclosure set forth herein.

As used herein, the term "(meth)acrylic acid" collectively refers to "acrylic acid" and "methacrylic acid" and also collectively refers to both compounds containing "meth" and compounds not containing "meth".

Thermoplastic Resin Composition for Laser Direct Structuring

One aspect of the present invention relates to a thermoplastic resin composition for laser direct structuring. In one embodiment, the thermoplastic resin composition includes: (A) a polyamide resin; (B) a polyester resin; (C) a rubber-modified aromatic vinyl graft copolymer; (D) an inorganic filler; and (E) an additive for laser direct structuring (LDS additive).

For example, the thermoplastic resin composition includes: 100 parts by weight of a base resin including about 25 wt % to about 55 wt % of the polyamide resin (A), about 5 wt % to about 25 wt % of the polyester resin (B), about 5 wt % to about 20 wt % of the rubber-modified aromatic vinyl graft copolymer (C), and about 25 wt % to about 50 wt % of the inorganic filler (D); and about 0.1 parts by weight to about 20 parts by weight of the LDS additive (E).

Hereinafter, components of the thermoplastic resin composition will be described in detail.

(A) Polyamide Resin

In one embodiment, the polyamide resin (A) may include an aliphatic polyamide resin. The aliphatic polyamide resin is a polyamide having no aromatic ring in a molecular chain and may contain a $C_{10}$ to $C_{20}$ aliphatic group.

In one embodiment, the aliphatic polyamide resin may be a homopolymer, copolymer, ternary copolymer, or higher order polymer formed from aminocarboxylic acid, lactam or diamine, and dicarboxylic acid. Here, the term "copolymer" refers to a polyamide having two or more amide and/or diamide repeat units.

The aminocarboxylic acid may be a $C_6$ to $C_{12}$ aminocarboxylic acid. For example, the aminocarboxylic acid may include 6-aminocaproic acid, 7-aminoheptanoic acid, 9-aminononanoic acid, 11-aminoundecanoic acid, 12-aminododecanoic acid, and the like.

The lactam may be a $C_4$ to $C_{12}$ lactam. For example, the lactam may include α-pyrrolidone, ε-caprolactam, ω-laurolactam, ε-enantolactam, and the like.

The diamine may be an aliphatic or alicyclic diamine. For examples, the diamine may include tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, m-xylylenediamine, and the like.

The dicarboxylic acid may be an aliphatic or alicyclic dicarboxylic acid. For example, the dicarboxylic acid may include adipic acid, 2-methyladipic acid, trimethyladipic acid, glutaric acid, 2,2-dimethylglutaric acid, pimelic acid, suberic acid, azelaic acid, sebacic acid, dodecanedioic acid, 1,4-cyclohexanedicarboxylic acid, malonic acid, dimethylmalonic acid, succinic acid, 2,2-diethylsuccinic acid, and the like.

In one embodiment, the aliphatic polyamide resin may be polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 615, polyamide 616, or polyamide 613. These may be used alone or as a mixture thereof, as needed.

In one embodiment, the aliphatic polyamide resin may include at least one selected from among polyamide 6, polyamide 66, polyamide 612, polyamide 1010, and polyamide 1012. In this embodiment, the thermoplastic resin composition can exhibit further improved properties in terms of impact resistance, heat resistance and processability.

In one embodiment, the aliphatic polyamide resin may have a glass transition temperature (Tg) of about 30° C. to about 90° C., for example, about 40° C. to about 70° C. In addition, the aliphatic polyamide resin may have a melting point (Tm) of about 160° C. to about 270° C. Within these ranges of glass transition temperature and melting point of the aliphatic polyamide, the thermoplastic resin composition can exhibit further improved properties in terms of impact strength and processability.

In one embodiment, the aliphatic polyamide resin may have a number average molecular weight (Mn) of about 10,000 g/mol to about 200,000 g/mol, without being limited thereto. Within this range, the thermoplastic resin composition can have further improved properties in terms of heat resistance and processability. For example, the aliphatic polyamide resin may have a number average molecular weight (Mn) of about 20,000 g/mol to about 150,000 g/mol.

In one embodiment, the polyamide resin (A) is present in an amount of about 25 wt % to about 55 wt % based on the total weight of the base resin including the polyamide resin (A), the polyester resin (B), the rubber-modified aromatic vinyl graft copolymer (C) and the inorganic filler (D). If the content of the polyamide resin (A) is less than about 25 wt %, it can be difficult for the thermoplastic resin composition to secure heat resistance and impact resistance, if the content of the polyamide resin (A) exceeds about 55 wt %, it can be difficult for the thermoplastic resin composition to secure bondability. Specifically, the polyamide resin (A) may be present in an amount of about 30 wt % to about 50 wt %. For example, the polyamide resin (A) may be present in an amount of about 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, or 55 wt %.

(B) Polyester Resin

The polyester resin (B) serves to secure bondability with respect to a matrix, such as a polycarbonate base, while improving heat resistance, mechanical strength, and fluidity.

In one embodiment, the polyester resin (B) may be obtained by polycondensation of a dicarboxylic acid component and a diol component, wherein the dicarboxylic acid component may include terephthalic acid (TPA), isophthalic acid (IPA), 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, an aromatic dicarboxylate in which acid is substituted with a dimethyl group, such as dimethyl terephthalate (DMT) and dimethyl isophthalate, alkyl esters of naphthalene dicarboxylic acid, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and combinations thereof, and the diol component may include a $C_2$ to $C_{12}$ ethylene glycol, 1,2-propylene glycol, 1,3-propylene glycol, 2,2-dimethyl-1,3-propane diol, 2,2-dimethyl-1,3-propylene glycol, 1,3-butane diol, 1,4-butane diol, 1,5-pentane diol, 1,5-pentane diol, 1,6-hexane diol, 1,3-cyclohexane dimethanol, 1,4-cyclohexane dimethanol, and combinations thereof.

In one embodiment, the polyester resin (B) may include at least one selected from among polyethylene terephthalate (PET), polybutylene terephthalate (PBT), polyethylene naphthalate (PEN), polytrimethylene terephthalate (PTT), and polycyclohexylene terephthalate (PCT). With this kind of polyester resin, the thermoplastic resin composition can secure good bondability to other materials, such as a polycarbonate resin, upon double injection molding while securing good properties in terms of heat resistance and mechanical strength. For example, the thermoplastic resin composition may include polybutylene terephthalate (PBT).

In one embodiment, the polyester resin (B) may have an inherent viscosity of about 0.6 dl/g to about 2.0 dl/g. Specifically, the inherent viscosity may be measured at 35° C. in o-chlorophenol as a solvent. Within this range of viscosity, the polyester resin can improve mechanical strength and molding processability of the polycarbonate resin composition. For example, the polyester resin (B) may have an inherent viscosity of about 0.8 dl/g to about 1.6 dl/g. Alternatively, the polyester resin (B) may have an inherent viscosity of about 0.8 dl/g to about 1.4 dl/g.

In one embodiment, the polyester resin (B) may have a weight average molecular weight of about 5,000 g/mol to about 30,000 g/mol. Within this range, the polyester resin can improve mechanical strength of the polycarbonate resin composition. For example, the polyester resin (B) may have a weight average molecular weight of about 5,000 g/mol to about 20,000 g/mol.

In one embodiment, the polyester resin (B) may be present in an amount of about 5 wt % to about 25 wt %, based on the total weight of the base resin including the polyamide resin (A), the polyester resin (B), the rubber-modified aromatic vinyl graft copolymer (C) and the inorganic filler (D). If the content of the polyester resin is less than about 5 wt %, it is difficult for the thermoplastic resin composition to secure bondability to other substrates, thereby making it difficult to achieve double injection molding, and if the content of the polyester resin exceeds about 25 wt %, the thermoplastic resin composition can suffer from deterioration in heat resistance, processability, and impact resistance. Specifically, the polyester resin (B) may be present in an amount of about 8 wt % to about 20 wt %. For example, the polyester resin (B) may be present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %.

In one embodiment, the polyester resin (B) and the polyamide resin (A) may be present in a weight ratio of about 1:1.5 to about 1:8. Within this weight ratio, the thermoplastic resin composition can exhibit good processability and heat resistance while securing bondability. For example, the polyester resin (B) and the polyamide resin (A) may be present in a weight ratio of about 1:1.5 to about 1:5.5.

(C) Rubber-Modified Aromatic Vinyl Graft Copolymer

The rubber-modified aromatic vinyl graft copolymer (C) may be obtained through graft polymerization of a monomer mixture of an aromatic vinyl monomer and a vinyl cyanide monomer on a rubber polymer.

In one embodiment, the rubber-modified aromatic vinyl graft copolymer (C) may be obtained by adding an aromatic vinyl monomer and a vinyl cyanide monomer to a rubber polymer, and further adding a monomer for imparting processability and heat resistance, as needed, followed by polymerization (graft polymerization). Here, polymerization may be carried out by any known polymerization method, such as emulsion polymerization, suspension polymerization, bulk polymerization, and the like.

In one embodiment, the rubber-modified aromatic vinyl graft copolymer may form a core (rubber polymer)-shell (copolymer of the monomer mixture) structure.

Examples of the rubber polymer may include: a butadiene rubber, such as polybutadiene, poly(styrene-butadiene), and poly(acrylonitrile-butadiene); a saturated rubber obtained by adding hydrogen to the diene rubber; an isoprene rubber; and an ethylene-propylene-diene monomer terpolymer (EPDM). These may be used alone or as a mixture thereof. For example, the rubber polymer may include a butadiene rubber.

In one embodiment, the rubber polymer (rubber particles) may have an average particle size (Z-average) of about 0.05 μm to about 6 μm. Within this range, the thermoplastic resin composition can have good properties in terms of impact resistance and external appearance. For example, the rubber polymer may have an average particle size of about 0.15 μm to about 4 μm. Alternatively, the rubber polymer may have an average particle size of about 0.25 μm to about 3.5 μm.

In one embodiment, the rubber polymer may be present in an amount of about 20 wt % to about 70 wt %, for example, about 30 wt % to about 60 wt %, based on the total weight of the rubber-modified aromatic vinyl graft copolymer. In addition, the monomer mixture (including the aromatic vinyl monomer and the vinyl cyanide monomer) may be present in an amount of about 30 wt % to about 80 wt %, based on the total weight of the rubber-modified aromatic vinyl graft copolymer. Within this range, the thermoplastic resin composition can have good properties in terms of impact resistance and external appearance. For example, the rubber polymer may be present in an amount of about 40 wt % to about 70 wt %.

In one embodiment, the aromatic vinyl monomer is graft-polymerizable with the rubber polymer and may include, for example, styrene, α-methylstyrene, β-methylstyrene, p-methyl styrene, p-t-butyl styrene, ethyl styrene, vinylxylene, monochlorostyrene, dichlorostyrene, dibromostyrene, and vinyl naphthalene. These may be used alone or as a mixture thereof.

In one embodiment, the aromatic vinyl monomer may be present in an amount of about 10 wt % to about 90 wt %, for example, about 40 wt % to about 90 wt %, based on 100 wt % of the monomer mixture. Within this range, the thermoplastic resin composition can exhibit good properties in terms of processability, impact resistance, and the like.

In one embodiment, the vinyl cyanide monomer is a monomer copolymerizable with the aromatic vinyl monomer and may include, for example, acrylonitrile, methacrylonitrile, ethacrylonitrile, phenyl acrylonitrile, α-chloroacrylonitrile, and fumaronitrile. These may be used alone or as a mixture thereof. For example, acrylonitrile or methacrylonitrile may be used as the vinyl cyanide monomer. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can exhibit good properties in terms of chemical resistance, mechanical properties, and the like.

Examples of the monomer for imparting processability and heat resistance may include (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

Examples of the rubber-modified aromatic vinyl graft copolymer (C) may include butadiene rubbers, a g-ABS copolymer in which styrene as an aromatic vinyl monomer and acrylonitrile as a cyanide vinyl monomer are grafted.

In one embodiment, the rubber-modified aromatic vinyl graft copolymer (C) may be present in an amount of about 5 wt % to about 20 wt % based on the total weight of the base resin including the polyamide resin (A), the polyester resin (B), the rubber-modified aromatic vinyl graft copolymer (C) and the inorganic filler (D). If the content of the rubber-modified aromatic vinyl graft copolymer (C) is less than about 5 wt %, the thermoplastic resin composition cannot secure impact resistance, and if the content of the rubber-modified aromatic vinyl graft copolymer exceeds about 20 wt %, the thermoplastic resin composition can suffer from deterioration in formability and heat resistance. Specifically, the rubber-modified aromatic vinyl graft copolymer (C) may be present in an amount of about 5 wt % to about 15 wt %. For example, the rubber-modified aromatic vinyl graft copolymer (C) may be present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

In one embodiment, the rubber-modified aromatic vinyl graft copolymer (C) and the polyamide resin (A) may be present in a weight ratio of about 1:1.5 to about 1:10. Within this range, the thermoplastic resin composition can exhibit good properties in terms of impact resistance, fluidity (molding processability), and external appearance.

(D) Inorganic Filler

In one embodiment, the inorganic filler may include at least one selected from among glass fibers, talc, wollastonite, whisker, silica, mica, and basalt fibers. For example, the inorganic filler may include glass fibers.

In one embodiment, the inorganic filler may include glass fibers having a non-circular cross-sectional shape, an aspect ratio (long diameter/short diameter in cross-section) of about 1.5 to 10 in cross-section, and an average length of about 2 mm to about 10 mm. Within this range, the thermoplastic resin composition can exhibit good properties in terms of heat resistance, impact resistance and modulus, while further improving plating adhesion.

In one embodiment, the inorganic filler (D) may be present in an amount of about 25 wt % to about 50 wt % based on the total weight of the base resin including the polyamide resin (A), the polyester resin (B), the rubber-modified aromatic vinyl graft copolymer (C) and the inorganic filler (D). If the content of the inorganic filler is less than about 25 wt %, it is difficult for the thermoplastic resin composition to secure heat resistance, and if the content of the inorganic filler exceeds about 50 wt %, the thermoplastic resin composition can suffer from deterioration in formability and plating adhesion due to appearance defect, and can have high dielectric constant, causing a problem in antenna performance. Specifically, the inorganic filler (D) may be present in an amount of about 25 wt % to about 40 wt %. For example, the inorganic filler (D) may be present in an amount of about 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %.

(E) Additive for Laser Direct Structuring

The LDS additive (E) serves to form metal nuclei upon irradiation with laser beams and may include any typical LDS additive used in resin compositions for LDS.

In one embodiment, the LDS additive may include at least one selected from among a heavy metal composite oxide spinel and a copper salt.

In one embodiment, the heavy metal composite oxide spinel may be represented by Formula 1

$$AB_2O_4,$$ [Formula 1]

where A is a metal cation having a valence of 2, for example, magnesium, copper, cobalt, zinc, tin, iron, manganese, nickel, and a combination thereof, and B is a metal cation having a valence of 3, for example, manganese, nickel, copper, cobalt, tin, titanium, iron, aluminum, chromium, and a combination thereof.

In one embodiment, the LDS additive (E) may include copper-iron spinel, copper-containing magnesium aluminum oxide, copper chromium manganese mixed oxides, copper-manganese iron mixed oxide (in each case optionally having an oxygen vacancy), copper salts and oxides, for example, copper (I) oxide, copper (II) oxide, copper phosphate, copper sulfate, cuprous thiocyanate and metal complex compounds, chelate compounds of copper, tin, nickel, cobalt, silver and palladium, or mixtures of such systems, and/or copper chromium manganese mixed oxides, copper manganese iron mixed oxide, copper chromium oxide, zinc iron oxide, cobalt chromium oxide, cobalt aluminum oxide, magnesium aluminum oxide, and mixtures thereof; surface-treated forms thereof; and/or oxygen vacancy-containing forms thereof. More specifically, the LDS additive (E) may include copper hydroxide phosphate, copper chromium oxide spinel, copper phosphate, copper sulfate, cuprous thiocyanate and combinations thereof.

In one embodiment, the LDS additive (E) may be present in an amount of about 0.1 parts by weight to about 20 parts by weight relative to 100 parts by weight of the base resin including the polyamide resin (A), the polyester resin (B), the rubber-modified aromatic vinyl graft copolymer (C), and the inorganic filler (D). If the content of the LDS additive is less than about 0.1 parts by weight, addition of the LDS additive provides an insignificant effect, and if the content of the LDS additive exceeds about 20 parts by weight, the thermoplastic resin composition can suffer from deterioration in formability, external appearance, rigidity, heat resistance, and plating adhesion due to excessive plating. Specifically, the LDS additive (E) may be present in an amount of about 1 part by weight to about 15 parts by weight. For example, the LDS additive (E) may be present in an amount of about 0.1, 1, 2, 3, 4, 5, 6, 7, 8, 9, 10, 11, 12, 13, 14, 15, 16, 17, 18, 19, or 20 parts by weight.

In one embodiment, the LDS additive (E) and the polyamide resin (A) may be present in a weight ratio of about 1:3 to about 1:10. Within this range, the LDS additive (E) can improve adhesion, external appearance, plating adhesion and heat resistance of the thermoplastic resin composition. For example, the LDS additive (E) may be present in a weight ratio of about 1:5 to about 1:9.

The thermoplastic resin composition according to one embodiment of the invention may be prepared in pellet form by mixing the aforementioned components, followed by melt extrusion at about 200° C. to about 300° C., for example, at about 220° C. to about 260° C. in a typical twin-screw extruder.

In one embodiment, the thermoplastic resin composition may have a weight-dropping fracture height of about 25 cm or more, at which dropping a 500 g metal-tip weight on a 1 mm thick specimen results in generation of cracks on the specimen in a DuPont drop test. For example, the thermoplastic resin composition may have a weight-dropping fracture height of about 25 cm to about 45 cm.

In one embodiment, the thermoplastic resin composition may have a bonding strength of about 15 kgf/cm$^2$ to about 40 kgf/cm$^2$, as measured on a bonding specimen at a rate of 5 mm/min using a universal testing machine (UTM), in which the bonding specimen is prepared by injection molding after bonding a specimen of the thermoplastic resin composition to a polycarbonate base to have a bonding size of 1.2 cm×1.2 cm×3.2 mm.

For example, a stepped specimen is prepared using a specimen formed of the thermoplastic resin composition and a polycarbonate base, followed by insert injection to prepare a bonding specimen having a bonding area of 1.2 cm (length)×1.2 cm (width)×3.2 mm (thickness). Then, with a primary side of the bonding specimen corresponding to the polycarbonate base secured to a jig, a secondary side of the bonding specimen corresponding to the specimen of the thermoplastic resin composition is bent at an angle of 180° and pulled at a rate of 5 mm/min using a UTM (Shimadzu Co. Ltd.) to measure bonding force, which in turn is divided by the bonding area to calculate bonding strength.

Molded Article Formed of Thermoplastic Resin Composition

The molded article according to the present invention is formed of the thermoplastic resin composition. For example, the molded article may be produced by any suitable molding method, such as injection molding, double injection molding, blowing, extrusion, and thermoforming, using the thermoplastic resin composition. The molded article may be easily formed by a person having ordinary skill in the art.

Figure 1:
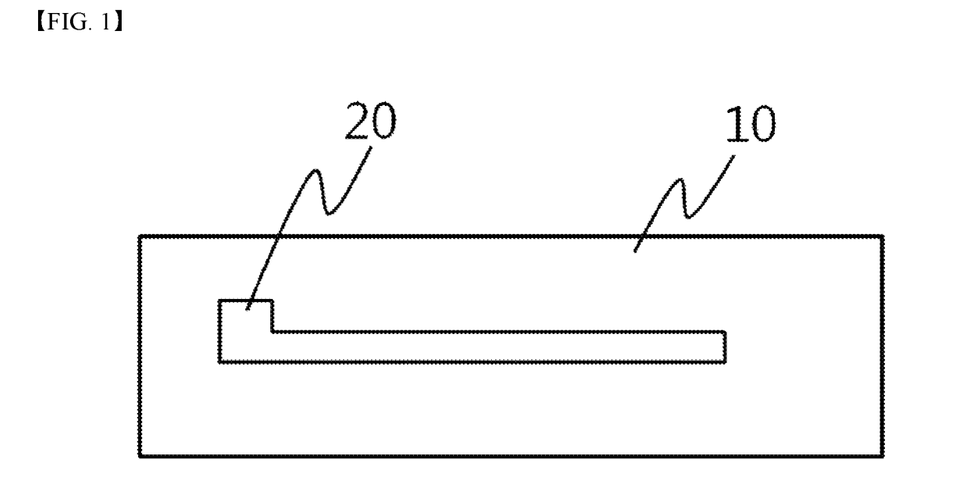
FIG. 1 is a sectional view of a molded article according to one embodiment of the present invention.

FIG. 1 is a sectional view of a molded article according to one embodiment of the present invention. It should be understood that sizes of components of a molded article shown in FIG. 1 are exaggerated for clear description and the present invention is not limited thereto. As shown in FIG. 1, a molded article 10 according to one embodiment of the invention may include a metal layer 20 formed on at least part of a surface of the molded article 10 through a laser direct structuring process and a plating process. The molded article 10 according to the embodiment may be a circuit carrier used for manufacture of an antenna. For example, the molded article 10 may be manufactured by forming a preform of the molded article 10 using the thermoplastic resin composition through injection molding; irradiating a target region (corresponding to the metal layer 20) on the surface of the molded article 10 with laser beams; and metalizing (plating) the irradiated region to form the metal layer 20.

In some embodiments, metal nuclei are formed through decomposition of the LDS additive contained in the molded article 10 by irradiation with the laser beams. In addition, the region irradiated with the laser beams has surface roughness suitable for plating. The laser beams may have a wavelength of 248 nm, 308 nm, 355 nm, 532 nm, 1,064 nm, or 10,600 nm.

In some embodiments, the metallization process may be carried out through a typical plating process. For example, the metal layer 20 (electrically conductive path) may be formed on the laser irradiated region of the surface of the molded article 10 by dipping the molded article 10 subjected to laser irradiation into one or more electroless baths. Examples of electroless plating may include copper plating, gold plating, nickel plating, silver plating, zinc plating, and tin plating, without being limited thereto.

In this way, the molded article in which the metal layer is formed on at least part of the surface of the molded article by laser direct structuring can be easily formed by a person having ordinary skill in the art.

The thermoplastic resin composition for laser direct structuring according to the present invention and the molded article produced therefrom have good properties in terms of plating adhesion, flexural modulus, impact resistance, and heat resistance, and can exhibit good bondability to a base material such as a polycarbonate to allow double injection molding.

Next, the present invention will be described in more detail with reference to some examples. It should be understood that these examples are provided for illustration only and are not to be in any way construed as limiting the present invention.

MODE FOR INVENTION

Details of components used in Examples and Comparative Examples are as follows.

(A) Polyamide resin: Polyamide 1012 was used.

(B) Polyester resin: Polybutylene terephthalate having an inherent viscosity of 1.2 dl/g was used.

(C) Rubber-modified aromatic vinyl graft copolymer: A g-ABS copolymer resin prepared by grafting 55 wt % of a mixture of styrene and acrylonitrile (weight ratio: 75/25) on 45 wt % of a butadiene rubber having a Z-average particle diameter of 310 nm was used.

(D) Inorganic filler: Plate-shaped glass fibers having a cross-sectional aspect ratio of 4 and an average length of 3 mm (Product Name: CSG 3PA-820, Nitto Boseki Co. Ltd.) was used.

(E) LDS additive: Copper hydroxide phosphate was used.

Examples 1 to 13 and Comparative Examples 1 to 11

The aforementioned components were weighed in amounts as listed in Tables 1 to 4 and subjected to extrusion in a twin-screw extruder (L/D=36, 45 mm) under conditions of a barrel temperature of 240° C., a screw rotation speed of 200 rpm, and a total discharge amount of 80 kg/h, thereby preparing thermoplastic resin compositions in pellet form. The prepared pellets were dried at 100° C. for 4 hours and subjected to injection molding using a 10 oz. injection machine at an injection molding temperature of 260° C., thereby preparing specimens for property evaluation. The prepared specimens were evaluated as to the following properties by the following methods and evaluation results are shown in Tables 1 to 4.

Property Evaluation (1) Flexural modulus (FM, kgf/cm$^2$): Flexural modulus was measured at a rate of 2.8 mm/min in accordance with ASTM D790.

(2) Flexural strength (FS, kgf/cm$^2$): Flexural strength was measured at a rate of 2.8 mm/min in accordance with ASTM D790.

(3) Heat resistance (heat deflection temperature (HDT), ° C.): HDT was measured in accordance with ASTM D648 (1.82 MPa, 120° C./hr.).

Figure 2:
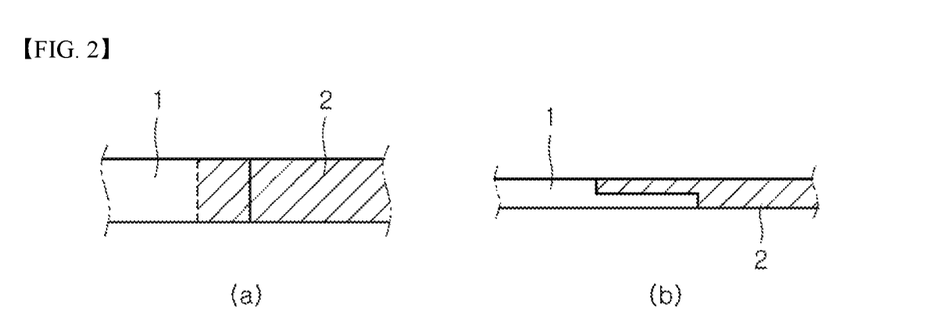
FIG. 2(a) shows a specimen for measurement of bonding strength prepared through double injection molding of a thermoplastic resin composition according to the present invention and a polycarbonate base.
FIG. 2(b) is a side view of the specimen for measurement of bonding strength.

(4) Bonding strength (kgf/cm$^2$): FIG. 2(*a*) shows a specimen for measurement of bonding strength prepared through double injection molding of the thermoplastic resin composition of Example 1 and a polycarbonate base, and FIG. 2(*b*) is a side view of the specimen for measurement of bonding strength.

As shown in FIG. 2, a stepped specimen was prepared using a specimen 2 prepared from each of the compositions of Examples 1 to 13 and Comparative Examples 1 to 11 and a polycarbonate base 1, and was subjected to insert injection molding to prepare a bonding specimen having a bonding area of 1.2 cm (length)×1.2 cm (width)×3.2 mm (thickness). Then, with a primary side of the bonding specimen corresponding to the polycarbonate base secured to a jig, a secondary side of the bonding specimen corresponding to the specimen of each of the thermoplastic resin compositions of the examples and the comparative examples was bent at an angle of 180° and pulled at a rate of 5 mm/min using a UTM (Shimadzu Co. Ltd.) to measure bonding force, which in turn was divided by the bonding area to calculate bonding strength.

(5) Surface impact resistance (weight dropping fracture height, cm): Weight dropping fracture height causing generation of cracks on a specimen having a size of 10 cm (length)×10 cm (width)×1 mm (height) was measured upon dropping a 500 g metal-tip weight on the specimen by the Dupont drop method.

(6) LDS plateability (plating adhesion): An injection-molded specimen having a size of 5 cm×1 cm×1 mm was subjected to aging at 25° C. for 6 hours, followed by activating a surface of the specimen in a stripe shape through laser direct structuring. Then, a 35 μm thick copper layer was formed in the stripe shape on the activated surface of the specimen through plating (copper electroless plating), thereby preparing a plated specimen. Then, the plated specimen was left in a chamber under high temperature/humidity conditions (85° C. and 85% RH) for 72 hours, followed by carving grid-lattices separated from each other by a distance of 2 mm on a plated region of the plated specimen. Thereafter, plating adhesion was evaluated based on the number of grid-lattices remaining on the plated region of the specimen upon detachment of a tape from the specimen by strongly separating the tape once in the perpendicular direction after attaching the tape thereto. Detachment of no specimen piece was evaluated as good plating adhesion and detachment of specimen pieces was evaluated as poor plating adhesion.

TABLE 1

| Item (unit: parts by weight) | Example | | | | | | |
|---|---|---|---|---|---|---|---|
| | 1 | 2 | 3 | 4 | 5 | 6 | 7 |
| (A) | 49 | 49 | 42 | 42 | 38 | 36 | 34 |
| (B) | 16 | 11 | 13 | 8 | 12 | 14 | 16 |
| (C) | 5 | 10 | 5 | 10 | 10 | 10 | 10 |
| (D) | 30 | 30 | 40 | 40 | 40 | 40 | 40 |
| (E) | 6 | 6 | 6 | 6 | 6 | 6 | 6 |
| Flexural modulus (kgf/cm$^2$) | 62200 | 58400 | 79400 | 78800 | 76400 | 75400 | 77300 |
| Flexural strength (kgf/cm$^2$) | 1370 | 1280 | 1510 | 1470 | 1340 | 1230 | 1280 |
| HDT (° C.) | 176 | 172 | 179 | 177 | 177 | 178 | 177 |
| Bonding strength (PC base, kgf/cm$^2$) | 16.5 | 17.6 | 17.9 | 19 | 21.1 | 23.6 | 30.3 |
| Surface impact resistance (cm) | 32.6 | 35.8 | 29.2 | 42.5 | 38.4 | 36 | 30.7 |
| LDS plateability | Good | Good | Good | Good | Good | Good | Good |

TABLE 2

| Item (unit: parts by weight) | Example | | | | | |
|---|---|---|---|---|---|---|
| | 8 | 9 | 10 | 11 | 12 | 13 |
| (A) | 32 | 32 | 32 | 32 | 32 | 32 |
| (B) | 18 | 18 | 16 | 14 | 12 | 10 |
| (C) | 10 | 10 | 12 | 14 | 16 | 18 |
| (D) | 40 | 40 | 40 | 40 | 40 | 40 |
| (E) | 6 | 6 | 6 | 6 | 6 | 6 |
| Flexural modulus (kgf/cm$^2$) | 80200 | 80200 | 76400 | 73000 | 72500 | 69200 |
| Flexural strength (kgf/cm$^2$) | 1270 | 1270 | 1270 | 1170 | 1140 | 1120 |
| HDT (° C.) | 177 | 177 | 176 | 174 | 172 | 171 |
| Bonding strength (PC base, kgf/cm$^2$) | 29.1 | 29.1 | 31.1 | 31 | 30.3 | 29.5 |
| Surface impact resistance (cm) | 26.5 | 26.5 | 35 | 36 | 43 | 43 |
| LDS plateability | Good | Good | Good | Good | Good | Good |

TABLE 3

| Item (unit: parts by weight) | Comparative Example | | | | |
|---|---|---|---|---|---|
| | 1 | 2 | 3 | 4 | 5 |
| (A) | 70 | 49 | 49 | 42 | 42 |
| (B) | — | 21 | — | 18 | — |
| (C) | — | — | 21 | — | 18 |
| (D) | 30 | 30 | 30 | 40 | 40 |
| (E) | 6 | 6 | 6 | 6 | 6 |
| Flexural modulus (kgf/cm$^2$) | 57600 | 61000 | 47600 | 87900 | 71200 |
| Flexural strength (kgf/cm$^2$) | 1420 | 1320 | 1050 | 1690 | 1350 |
| HDT (° C.) | 178 | 179 | 164 | 179 | 171 |
| Bonding strength (PC base, kgf/cm$^2$) | 0 | 11.5 | 11.7 | 12.9 | 12.3 |
| Surface impact resistance (cm) | 65 | 22 | 71.2 | 22.5 | 77 |
| LDS plateability | Good | Good | Good | Good | Good |

TABLE 4

| Item (unit: parts by weight) | Comparative Example | | | | | |
|---|---|---|---|---|---|---|
| | 6 | 7 | 8 | 9 | 10 | 11 |
| (A) | 20 | 60 | 35 | 40 | 30 | 49 |
| (B) | 25 | 10 | 30 | 10 | 10 | 16 |
| (C) | 15 | 5 | 5 | 25 | 7 | 5 |
| (D) | 40 | 25 | 30 | 25 | 53 | 30 |
| (E) | 6 | 6 | 6 | 6 | 6 | 23 |
| FM (2.8 mm/min) | 70500 | 56000 | 67000 | 60000 | 12800 | 68000 |
| FS (2.8 mm/min) | 1200 | 1300 | 1400 | 1350 | 1650 | 1350 |
| HDT (1.82 MPa) | 150 | 171 | 155 | 145 | 177 | 171 |
| Bonding strength (PC base, kgf/cm$^2$) | 19.5 | 4.5 | 18.5 | 11.5 | 4.5 | 6.5 |
| Surface impact resistance (cm) | 18 | 69 | 19 | 77 | 60 | 70 |
| LDS plateability | Good | Good | Good | Good | Poor | Poor |

Referring to Tables 1 to 4, it could be seen that the thermoplastic resin compositions of Examples 1 to 13 had good plating adhesion and good bondability with respect to the polycarbonate base to allow double injection molding, and exhibited good properties in terms of heat resistance, surface impact resistance, flexural modulus, flexural strength, and balance therebetween.

Conversely, the composition of Comparative Example 1 free from the polyester resin and the rubber-modified aromatic vinyl graft copolymer failed to be bonded to the polycarbonate base and suffered from deterioration in flexural modulus and flexural strength; the compositions of Comparative Examples 2 and 4 free from the rubber-modified aromatic vinyl graft copolymer suffered from deterioration in surface impact resistance and bonding strength; and the compositions of Comparative Examples 3 and 5 free from the polyester resin suffered from deterioration in bonding strength and heat resistance.

In addition, the composition of Comparative Example 6 prepared using a smaller content of the polyamide resin than that of present invention suffered from deterioration in heat resistance and surface impact resistance; the composition of Comparative Example 7 prepared using an excess of the polyamide resin suffered from deterioration in flexural modulus and bonding strength; the composition of Comparative Example 8 prepared using an excess of the polyester resin suffered from deterioration in heat resistance and surface impact resistance; the composition of Comparative Example 9, in which the content of the rubber-modified aromatic vinyl graft copolymer was out of the content range of the present invention, suffered from deterioration in bonding strength and heat resistance; the composition of Comparative Example 10 prepared using an excess of the inorganic filler suffered from deterioration in bonding strength and plateability; and the composition of Comparative Example 10 prepared using an excess of the LDS additive suffered from deterioration in plating adhesion and bonding strength due to excessive plating.

It should be understood that various modifications, changes, alterations, and equivalent embodiments can be made by those skilled in the art without departing from the spirit and scope of the present invention.

The invention claimed is:

1. A thermoplastic resin composition comprising:
   100 parts by weight of a base resin comprising about 25 wt % to about 55 wt % of a polyamide resin, about 5 wt % to about 25 wt % of a polyester resin, about 5 wt % to about 20 wt % of a rubber-modified aromatic vinyl graft copolymer, and about 25 wt % to about 50 wt % of an inorganic filler; and
   about 0.1 parts by weight to about 20 parts by weight of an additive for laser direct structuring.

2. The thermoplastic resin composition according to claim 1, wherein the polyamide resin comprises an aliphatic polyamide resin.

3. The thermoplastic resin composition according to claim 1, wherein the polyamide resin comprises polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 615, polyamide 616, and/or polyamide 613.

4. The thermoplastic resin composition according to claim 1, wherein the polyester resin comprises polyethylene terephthalate, polybutylene terephthalate, polyethylene naphthalate, polytrimethylene terephthalate, and/or polycyclohexylene terephthalate.

5. The thermoplastic resin composition according to claim 1, wherein the polyester resin an inherent viscosity of about 0.6 dl/g to about 2.0 dl/g.

6. The thermoplastic resin composition according to claim 1, wherein the rubber-modified aromatic vinyl graft copolymer is obtained by graft polymerization of a monomer mixture of an aromatic vinyl monomer and a vinyl cyanide monomer on a rubber polymer.

7. The thermoplastic resin composition according to claim 1, wherein the rubber-modified aromatic vinyl graft copolymer and the polyamide resin are present in a weight ratio of about 1:1.5 to about 1:10.

8. The thermoplastic resin composition according to claim 1, wherein the polyester resin and the polyamide resin are present in a weight ratio of about 1:1.5 to about 1:8.

9. The thermoplastic resin composition according to claim 1, wherein the inorganic filler comprises glass fibers, talc, wollastonite, whisker, silica, mica, and/or basalt fibers.

10. The thermoplastic resin composition according to claim 1, wherein the additive for laser direct structuring comprises a heavy metal composite oxide spinel and/or a copper salt.

11. The thermoplastic resin composition according to claim 1, wherein the additive for laser direct structuring and the polyamide resin are present in a weight ratio of about 1:3 to about 1:10.

12. The thermoplastic resin composition according to claim 1, wherein the thermoplastic resin composition has a weight-dropping fracture height of about 25 cm or more, at which dropping a 500 g metal-tip weight on a 1 mm thick specimen results in generation of cracks on the specimen in a DuPont drop test.

13. The thermoplastic resin composition according to claim 1, wherein the thermoplastic resin composition has a bonding strength of about 15 kgf/cm$^2$ to about 40 kgf/cm$^2$, as measured on a bonding specimen at a rate of 5 mm/min using a universal testing machine (UTM), the bonding specimen being prepared by injection molding after bonding a specimen of the thermoplastic resin composition to a polycarbonate base to have a bonding size of 1.2 cm×1.2 cm×3.2 mm.

14. A molded article formed of the thermoplastic resin composition according claim 1.

15. The molded article according to claim 14, wherein the molded article comprises a metal layer formed on at least part of a surface thereof through a laser direct structuring process and a plating process.

* * * * *